April 15, 1941.    G. WIRTH    2,238,240
PROCESS AND APPARATUS FOR PRODUCING HYDROCARBONS
Filed March 23, 1940

Gustav Wirth Inventor
By P. L. Young Attorney

Patented Apr. 15, 1941

2,238,240

UNITED STATES PATENT OFFICE 2,238,240

PROCESS AND APPARATUS FOR PRODUCING HYDROCARBONS

Gustav Wirth, Leuna, Germany, assignor, by mesne assignments, to William Ellyson Currie, New York, N. Y.

Application March 23, 1940, Serial No. 325,517
In Germany April 29, 1939

5 Claims. (Cl. 260—449)

The present invention relates to the production of hydrocarbons from carbon monoxide and hydrogen.

It is known that for the catalytic conversion of carbon monoxide with hydrogen for the production of hydrocarbons with more than one carbon atom in the molecule, which is a strongly exothermic conversion, the reaction temperature must be maintained within narrow limits.

As a means for the rapid removal of the heat evolved in strongly exothermic conversions it has already been proposed to surround the reaction space with liquids undergoing vaporization, in particular with water undergoing vaporization, the vapor formed being employed for heating purposes or for generating power. In such cases, the amount of cooling liquid vaporized is replaced by fresh liquid, which, in case impure cooling liquid is used, may cause difficulties due to the formation of deposits, such as boiler-scale.

It has also been proposed, when using several reaction systems, to collect the vapor formed from the cooling liquid in one common vessel. In this case the drawback is encountered that the temperature regulation of the various reaction systems becomes less flexible since for all reaction systems the cooling liquid has the same temperature, namely that of the common vessel in which the vapor, for example, steam is collected.

I have now found that the said production of hydrocarbons containing more than one carbon atom in the molecule by catalytic conversion of carbon monoxide with hydrogen in a plurality of reaction systems from which the heat evolved is removed by indirect heat exchange relation with a cooling liquid may be carried out in an advantageous manner if each of the reaction systems is provided with a separate closed cooling system containing the cooling liquid, which is vaporized in a cooling space by indirect heat exchange with the respective reaction system, while the vapors of the cooling liquid are condensed and returned to the cooling space, and if the condensation of the vapors of separate cooling systems belonging to two or more reaction systems is effected by indirect heat exchange with a liquid undergoing vaporization in a common secondary vaporizer.

Figure 2:
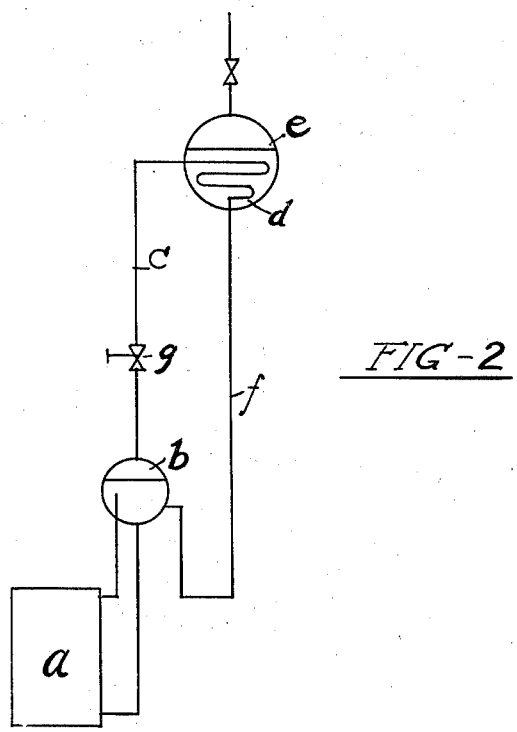
Figure 1:
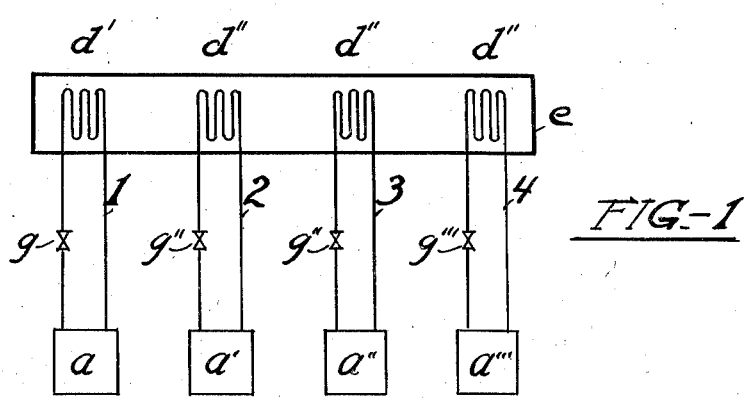

In Figure 1 of the accompanying drawing, an apparatus for use in the process in accordance with the present invention is illustrated diagrammatically, whereas in Figure 2 a reaction system and the closed cooling system connected therewith are illustrated in greater detail. Referring to Figure 1, each reaction system $a$, $a'$, $a''$, $a'''$ is connected with a separate closed cooling system $1$, $2$, $3$ and $4$, respectively. The condensing coils $d$, $d'$, $d''$ and $d'''$ for said closed cooling systems are contained in a common secondary vaporizer $e$ for the heat transfer from the vapors of the cooling liquid to a liquid undergoing vaporization in the said secondary vaporizer. The cooling systems are respectively provided with valves $g$, $g'$, $g''$ and $g'''$ for regulating the vapor pressure therein as described below.

Since the reaction systems or single reaction spaces therein may be maintained at considerably different temperatures and the evolution of heat in the reaction spaces may change in the course of a period of operation, it is advisable, as the heat-exchange surfaces of the condensing coils $d$, $d'$, $d''$ and $d'''$ are approximately of similar size and invariable, to regulate the temperature in each of the reaction systems by adjusting the heat given off by the condensing cooling liquid in the secondary vaporizer to the heat transmitted to the cooling liquid from the reaction space by regulation of the vapor pressure and thereby also of the temperature prevailing in the cooling systems.

This can be attained as has been shown in Figure 2, by regulating valve $g$, arranged in the vapor line $c$ which valve is operated by hand or automatically, and which throttles the flow of vapor to the condensing coil $d$, in case the vapor pressure in separator $b$, in which vapors separate from entrained liquid, falls below a desired value. By the drop of the vapor pressure behind the regulating valve in the vapor line $c$ and in the condensing coil $d$ also the temperature of the vapor decreases at these places and likewise the amount of heat transmitted to the liquid undergoing vaporization in the secondary vaporizer $e$ becomes smaller; moreover liquid is pressed upwards in line $f$ by the higher pressure in separator $b$. In case the pressure of the column of liquid rising in $f$ does not compensate the reduction in vapor pressure in line $c$ and condenser $d$ caused by throttling the vapor by valve $g$, the column of liquid in $f$ is sucked up to condenser $d$ so that the heat transfer in vaporizer $e$ decreases further until equilibrium between evolution of heat in the reaction system $a$ and the heat transfer through condenser $g$ in $e$ is attained.

While water may be employed as a cooling liquid in the closed cooling system the process described is particularly advantageous in those cases where the employment of another cooling liquid is preferable, in particular if the conversion temperature is so high that apparatus stable to the pressure of water vapor then prevailing are very expensive. In such case cooling liquids having a low vapor pressure are more advantageous, for example, di-phenyl oxide, the vapor of di-phenyl oxide being suitable for generating steam in the secondary vaporizer e which alone can be constructed stable to pressure at a considerably smaller expense than the total apparatus.

The reaction systems may have any desired construction allowing of cooling with a liquid undergoing vaporization. Several reaction spaces may be combined in one reaction system cooled by a single closed cooling system. Thus a number of reaction tubes may be arranged in one single cooling space, or one single reaction space may be in heat exchange relation with a large number of tubes which all belong to one and the same cooling system.

The conversion temperatures generally range between 150° and 380° C. The operation may be effected at ordinary or superatmospheric pressure, for example, between 5 and 30 atmospheres, or also at higher pressures, such as 100 atmospheres and more.

The process makes possible a very simple construction of the cooling devices for the reaction spaces. A further great advantage consists in the fact that the cooling spaces which are very difficulty accessible, remain free from any deposition of boiler-scale and sludge, since the same cooling liquid is continuously recycled. The process renders it further possible, by the application of liquids other than water, to maintain in the cooling spaces temperatures substantially above those of boiling water at ordinary and moderately elevated pressures.

What I claim is:

1. A process for the production of hydrocarbons containing more than one carbon atom in the molecule by catalytic conversion of carbon monoxide with hydrogen in a plurality of reaction systems from which the heat evolved is removed by indirect heat exchange relation with a cooling liquid, which comprises bringing each of the said systems into indirect heat exchange relation with a separate amount of cooling liquid, condensing the vapors formed from each of the said separate amounts of cooling liquid in a separate system by indirect heat exchange relation with the same body of a secondary liquid and recycling each condensate to the heat exchange relation with the reaction system from which it is desired.

2. In the process as claimed in claim 1, regulating the temperature in each of the reaction systems by adjusting the heat given off from the condensing vapors of the cooling liquid to the secondary liquid to the heat transferred to the cooling liquid from the reaction system by regulating the vapor pressure of the cooling liquid which is in heat exchange relation with the said reaction system.

3. Apparatus for the catalytic conversion of carbon monoxide with hydrogen comprising a plurality of reaction systems, a separate closed cooling system for each reaction system, said cooling system comprising a cooling device for taking up cooling liquid and for maintaining it in relation with said reaction system, and a condenser for condensing vapors evolved from the said cooling liquid, all of said condensers being arranged in one common vessel for taking up a secondary liquid, a connection between each of said cooling devices and the condenser pertaining thereto for conducting vapors of said cooling liquid, and a connection from each of the said condensers to the cooling device pertaining thereto for returning condensed liquid.

4. Apparatus as claimed in claim 3 in which the connections from said cooling devices to said condensers are provided with a vessel adapted for separating liquid parts carried off with the vapors cooled from the cooling liquid.

5. Apparatus as claimed in claim 3 in which the connections from said cooling devices to said condensers are provided with a throttle valve.

GUSTAV WIRTH.